US008926420B2

(12) United States Patent
Demsetz et al.

(10) Patent No.: US 8,926,420 B2
(45) Date of Patent: Jan. 6, 2015

(54) GAMING APPARATUS WITH GEOMETRICALLY ORIENTED GAME ELEMENTS

(75) Inventors: Randy Demsetz, Volo, IL (US); Lawrence Hodgson, Kildeer, IL (US); Leonid Smikun, Glenview, IL (US)

(73) Assignee: Incredible Technologies, Inc.IL (US)

( * ) Notice: Subject to any disclaimer, the term of this patent is extended or adjusted under 35 U.S.C. 154(b) by 239 days.

(21) Appl. No.: 13/480,269

(22) Filed: May 24, 2012

(65) Prior Publication Data

US 2012/0231873 A1 Sep. 13, 2012

Related U.S. Application Data

(63) Continuation of application No. 12/331,994, filed on Dec. 10, 2008, now Pat. No. 8,323,086.

(60) Provisional application No. 61/007,603, filed on Dec. 14, 2007.

(51) Int. Cl.
*A63F 9/24* (2006.01)
*A63F 13/00* (2014.01)
*G07F 17/32* (2006.01)

(52) U.S. Cl.
CPC ........ *G06F 17/3211* (2013.01); *G07F 17/3265* (2013.01)
USPC .................................. 463/20; 463/25; 463/31

(58) Field of Classification Search
None
See application file for complete search history.

(56) References Cited

U.S. PATENT DOCUMENTS

| | | | | |
|---|---|---|---|---|
| 4,180,271 | A * | 12/1979 | McMurchie | 273/275 |
| 5,980,384 | A * | 11/1999 | Barrie | 463/16 |
| 5,996,997 | A * | 12/1999 | Kamille | 273/139 |
| 6,089,977 | A * | 7/2000 | Bennett | 463/20 |
| 6,095,921 | A * | 8/2000 | Walker et al. | 463/20 |
| 6,398,641 | B1 * | 6/2002 | Yamagami et al. | 463/9 |
| 6,579,178 | B1 * | 6/2003 | Walker et al. | 463/20 |
| 6,632,140 | B2 * | 10/2003 | Berman et al. | 463/18 |
| 6,896,615 | B2 * | 5/2005 | Berman | 463/20 |
| 7,311,603 | B2 * | 12/2007 | Walker et al. | 463/20 |
| 7,419,431 | B2 * | 9/2008 | Gauselmann et al. | 463/30 |
| 7,431,645 | B2 * | 10/2008 | Han et al. | 463/16 |
| 7,674,176 | B2 * | 3/2010 | Berman et al. | 463/20 |
| 7,717,787 | B2 * | 5/2010 | Walker et al. | 463/20 |
| 7,874,910 | B2 * | 1/2011 | Berman | 463/20 |
| 8,016,289 | B2 * | 9/2011 | Walker et al. | 273/143 R |
| 8,187,084 | B2 * | 5/2012 | Walker et al. | 463/20 |
| 8,287,363 | B2 * | 10/2012 | White | 463/25 |
| 8,414,377 | B1 * | 4/2013 | White | 463/16 |
| 8,444,144 | B2 * | 5/2013 | Walker et al. | 273/143 R |
| 2003/0045345 | A1 * | 3/2003 | Berman | 463/20 |
| 2003/0181239 | A1 * | 9/2003 | Walker et al. | 463/20 |
| 2004/0166929 | A1 * | 8/2004 | Tarantino | 463/22 |
| 2005/0221885 | A1 * | 10/2005 | Walker et al. | 463/20 |
| 2008/0032783 | A1 * | 2/2008 | Walker et al. | 463/20 |
| 2008/0045321 | A1 * | 2/2008 | Kato | 463/20 |
| 2009/0156295 | A1 * | 6/2009 | Demsetz et al. | 463/20 |
| 2013/0252703 | A1 * | 9/2013 | Walker et al. | 463/20 |

* cited by examiner

*Primary Examiner* — Steven J Hylinski
(74) *Attorney, Agent, or Firm* — Husch Blackwell LLP; George S. Pavlik

(57) ABSTRACT

A gaming apparatus with geometrically oriented elements is disclosed. Specifically, an array of game elements are displayed, each of which has a discrete geometric orientation, and whose relative geometric orientations, in addition to relative placement of each gaming element, determines winning patterns which result in payout to a player.

27 Claims, 1 Drawing Sheet

GAMING APPARATUS WITH GEOMETRICALLY ORIENTED GAME ELEMENTS

CROSS-REFERENCE TO RELATED APPLICATIONS

This application is a continuation of U.S. Utility patent application Ser. No. 12/331,994, filed Dec. 10, 2008, entitled Gaming Apparatus With Geometrically Oriented Game Elements, which claims the benefit of the filing date of U.S. Provisional Application No. 61/007,603, filed Dec. 14, 2007 and entitled Gaming Apparatus With Geometrically Oriented Elements. The '603 application is incorporated herein by reference.

OBJECTS OF THE INVENTION

An object of the invention is to provide a gaming apparatus with geometrically oriented game elements.

A second object of the invention is to provide a gaming apparatus with geometrically oriented game elements which is integrated into a gaming experience in which the geometric orientation of the gaming elements is appropriate.

A third object of the invention is to provide a new and improved gaming experience by integrating new methods of play into familiar archetypes to allow players to easily understand the new gaming experience.

Other objects and advantages of the invention will become apparent in the following disclosure.

BRIEF SUMMARY OF THE INVENTION

The present invention relates to a gaming system having geometrically oriented game elements. Whereas in a traditional slot machine, whether electronic, mechanical, or a hybrid of both, the game elements are formed into a two-dimensional array and the relative positions of gaming elements (e.g., the gaming elements may form a horizontal line of like elements,) determines whether the player has won a prize, in the invention, the gaming elements have individual geometric orientations and the orientation of an element or elements is itself determinative of the prize, if any, paid to a player. This allows both a new and novel form of presentation and the integration of games that logically call for a horizontal movement of game elements.

BRIEF DESCRIPTION OF THE SEVERAL VIEWS OF THE DRAWINGS

The characteristic features of the invention will be particularly pointed out in the claims. The descriptions of the preferred embodiment refer to the preceding drawings:

DETAILED DESCRIPTION OF THE INVENTION

Figure 1:
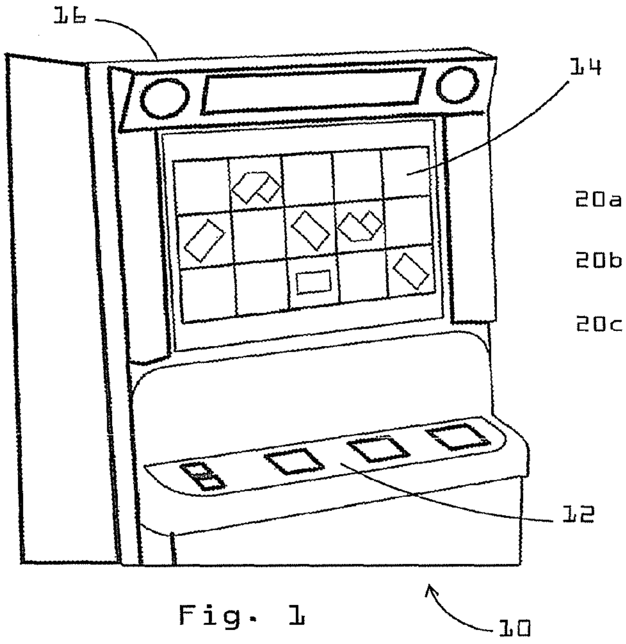
FIG. 1 is an abstract representational view of the entire apparatus.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

The description of the preferred embodiment uses the invention in a gaming apparatus of the type usually referred to as a "slot machine." It could be used in any appropriate gaming or entertainment device, including but not limited to such things as a video poker game, a video keno game, a combination gaming machine, or even a coin-operated or bartop amusement device.

By referring to FIG. 1, the basic concept of the invention may be easily understood. Gaming Unit 10 comprises cabinet 16, which contains user control array 12 and display 14, which displays the gaming elements during play. (See FIGS. 2, 3, 4.) The player uses control array 12 to control the game, after either having inserted money or electronically provided the game with the player's account information for cashless play. The game uses any desired means of selecting gaming elements, either through the operation of chance, the exercise of skill, or both, and displays the results on the display 14, after which the player is rewarded for winning combinations if any are present.

Figure 2:
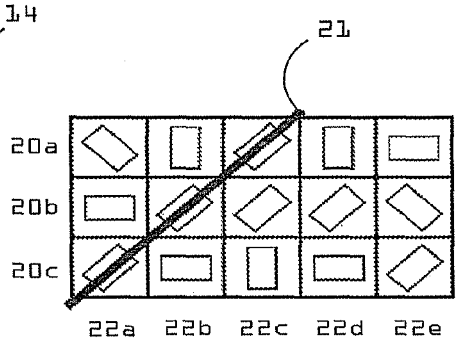
FIG. 2 is an abstract representational view of an embodiment of the display of the apparatus.

FIG. 2 shows an abstracted possible outcome of a game played on gaming unit 10 (Not shown: see FIG. 1.) Here, all the symbols are the same—simple rectangles. Normally, this would present a completely winning field on a typical slot machine, since proximity of identical symbols is all that is required to make a winning combination. However, only the rectangles connected by line 21 are in the geometric orientation necessary to make a complete line of three oriented elements, and using the invention, only this constitutes a winning combination. It is preferred, but not required, that the total universe of symbols in actual practice include multiple types of symbols. It is acceptable for some of the symbols to have no orientation at all, including "nulls" which cannot form part of a winning combination, "bonus elements" which might by their singular presence cause the player to win a prize, or multiple elements having individual orientations which are not allowed to form winning geometric orientations. For instance, if part of the universe of potential symbols were stylized representations of current U.S. paper currency, their rectangular shapes would correspond to the described embodiment of FIG. 2, with some added indication of denomination, but could have the additional requirement that only shapes comprised of identical denominations would be considered winning combinations. Although it does not form part of the claimed invention, it is further disclosed herein that such usages could also control the amount of a paid prize—a line of $10 bills might pay ten times the prize paid by a line of $1 bills.

It will be obvious to those of ordinary skill in the art that adding geometric orientation allows for a far larger number of total possible outcomes without adding additional symbols to the universe of possible selections. Among other advantages, this allows a larger sub-universe of winning combinations than is practical without the invention. For instance, a line of two properly oriented elements might win a small prize, even in a game with a relatively small universe of symbols, whereas this might not be practical in a game where only the proximity of similar symbols is evaluated when determining winning combinations.

Figure 3:
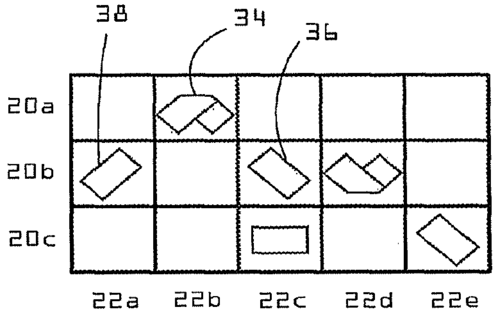
FIG. 3 is an abstract representational view of an embodiment of the display of the apparatus showing an alternative proper geometric orientation of game elements.

FIG. 3 shows an alternate possible combination of game elements detailing one of the possibilities that the invention makes practical. Rows 20*a*, 20*b*, and 20*c* and columns 22*a*, 22*b*, 22*c*, 22*d*, and 22*e* contain game elements (in this case, abstract geometric figures.) While it is permissible to use abstract game elements and symbols, it is also permissible and may be desirable to style the game elements as objects that might have similar multiple orientations in the real world, e.g. the elements could be dollar bills or other monetary notes folded into a variety of shapes. Other possibilities include people or animals oriented at different angles, only one of which represents a line of sight, vehicles which move in a fixed direction relative to their orientation, or any other desired representation.

Figure 4:
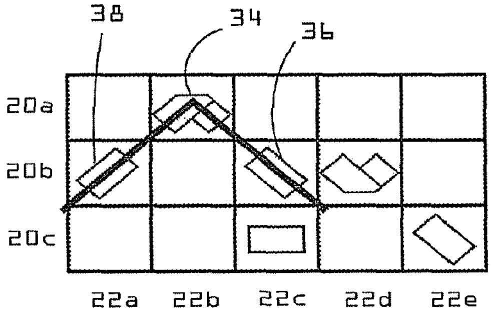
FIG. 4 is an abstract representational view of an embodiment of the display of the apparatus showing the proper geometric orientation of game elements.

FIG. 4 shows the game elements of FIG. 3 in a final position and demonstrates the winning and non-winning orientation of game elements. First game element 34 is oriented to form a downward-opening ninety-degree angle, with parts of the element oriented to one hundred and thirty five degrees from the vertical and two hundred and twenty five degrees from the vertical. Second game element 36 is oriented at three hundred and fifteen degrees from the vertical, which aligns it with the one of the downward parts of first game element 34. Similarly, third game element 38 is oriented at forty five degrees from the vertical, aligning it with the other downward part of first game element 34. Together, first game element 34, second game element 36, and third game element 38 form a larger coherent pattern of aligned elements, emphasized by the heavy black line. This might be considered a winning configuration and produce a prize of some type. While a traditional slot machine might offer a prize for a similar configuration of non-geometrically-oriented elements—to analogize to the described embodiment, it might "pay on triangles of matching symbols"—a slot machine incorporating the invention allows the player to easily envision such winning combinations and understand intuitively why a given combination is a winning combination. Furthermore, the incorporation of the invention allows a greater diversity of total combinations, in that without the geometric orientation requirement, a given combination of matching symbols is either a winning combination or it is not. With the invention, a combination of matching symbols could be a winning combination if the symbols are in the proper orientation to form a geometric figure, or a non-winning combination if they are in the proper places but not in the proper orientation to form a geometric figure.

It will be obvious to those of ordinary skill in the art that the invention can be practiced either as a mechanical device by using "reels" or other spinning mechanisms which are oriented in a horizontal and/or vertical manner, or by using a video display controlled by a computer of some kind and simply drawing the elements and the virtual motion thereof. While it is theoretically possible to incorporate both a simple horizontal, a simple vertical, and/or a multidimensional movement in a mechanical device, it is strongly preferred, but not required, to practice the invention as a video display controlled by a computer of some kind. This would allow infinitely variable motion and varied game elements, all of which could incorporate, to whatever desired degree, the elements of traditional slot machine play, but incorporate the invention's teaching of geometrically aligned game element placement. It would also allow players to easily exercise some form of skill to control, or influence, the outcome of any particular game by programming input opportunities for players based on memory, dexterity, knowledge, or any other player skill or combination of skills.

While the description above details the preferred and best mode(s) of practicing the invention, many other configurations and variations are possible. For example:

1) The invention need not be practiced as a gaming unit, but could be a coin-operated amusement device, a home gaming system, or any other appropriate system.

2) The invention could be incorporated into a larger system of games which communicate with each other, allow play against other players, or form a competition or a cooperative of competing teams rather than an exercise of individual chance or skill.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Accordingly, the scope of the invention should be determined not by the embodiment(s) illustrated, but by the claims below and their equivalents.

What is claimed is:

1. A game playing apparatus comprising:

an electronic processing unit; a display device coupled to the processing unit where a plurality of game symbols is displayed on the device as an array where each symbol of the plurality exhibits at least one discrete geometric orientation relative to a line of the display, and where some members of the plurality of symbols have a common geometric orientation and other members of the plurality have a different orientation relative to the line of the display; and wherein the processing unit determines if at least two of the symbols which have the common geometric orientation are adjacent to one another and exhibit a predetermined winning pattern, the predetermined winning pattern crossing at least one of two different rows of the array or two different columns of the array and corresponding to two different intersecting linear configurations and where at least one different symbol exhibits two different geometric orientations relative to the line of the display.

2. An apparatus as in claim 1 where the winning pattern comprises a linear arrangement of the at least two symbols which extends across at least two rows of the array.

3. An apparatus as in claim 1 where the at least two symbols are substantially identical.

4. An apparatus as in claim 1 where the processing unit determines that the winning pattern comprises an arrangement of at least three substantially identical symbols which have the common geometric orientation and which extend across at least two different rows of the array.

5. An apparatus as in claim 4 wherein the arrangement of at least three substantially identical symbols extends across at least two different columns of the array.

6. An apparatus as in claim 1 where the predetermined winning pattern extends, at least in part, linearly, at an angle greater than zero degrees, relative to the line of the display.

7. An apparatus as in claim 1 where the predetermined winning pattern extends linearly at first and second different angles relative to the line of the display.

8. An apparatus as in claim 1 where the processing unit determines if two substantially identical symbols, one having the one geometric orientation, and the other having the different orientation, are each adjacent to the one different symbol to exhibit the winning pattern.

9. An apparatus as in claim 1 where the symbols of the predetermined winning pattern each exhibit a predetermined visual characteristic within each respective symbol shape.

10. An apparatus as in claim 9 where a reward to a player is based, at least in part, on the predetermined winning pattern.

11. An apparatus as in claim 9 where the predetermined visual characteristic is common to each respective symbol of the predetermined winning pattern.

12. An apparatus as in claim 1 where the symbols of the predetermined winning pattern each exhibit a predetermined visual characteristic within each respective symbol shape.

13. An apparatus as in claim 12 where the predetermined visual characteristic is common to each respective symbol of the predetermined winning pattern.

14. A game playing apparatus comprising:

an electronic processing unit; a display device coupled to the processing unit where a plurality of game symbols is displayed on the device as an array where each symbol of the plurality exhibits at least one discrete geometric orientation relative to a line of the display, and where some members of the plurality of symbols have a common geometric orientation and other members of the plurality have at least one different orientation relative to the line of the display; and wherein the processing unit determines if at least two of the symbols, which, at least in part, have the common geometric orientation exhibit a predetermined winning pattern that comprises an arrangement of the at least two symbols which extends across at least two rows of the array, the predetermined winning pattern including three symbols, where two of the three symbols each have different geometric orientations and the third symbol exhibits both orientations, and is adjacent to each of the two symbols.

15. A game playing apparatus as in claim 14 where the symbols of the predetermined winning pattern each exhibit a common, predetermined, visual characteristic within each respective symbol shape.

16. A game playing apparatus as in claim 15 where a reward to a player is based, at least in part, on the winning pattern.

17. A game playing apparatus as in claim 14 where the at least two symbols which have the common geometric orientation are adjacent to one another.

18. A game playing apparatus as in claim 17 where the symbols of the predetermined winning pattern each exhibit a predetermined visual characteristic within each respective symbol shape.

19. A game playing apparatus as in claim 18 where the predetermined visual characteristic is common to each respective symbol of the predetermined winning pattern.

20. A game playing apparatus as in claim 14 where some of the symbols of the winning pattern are in one column and others are in a different column of the array.

21. A game playing apparatus as in claim 20 where some of the symbols of the winning pattern are adjacent to others of the winning pattern.

22. A game playing apparatus as in claim 14 where some of the symbols of the winning pattern are in one column and others are in a different column of the array.

23. A game playing apparatus as in claim 22 where some of the symbols of the winning pattern are adjacent to others of the winning pattern.

24. A game playing apparatus as in claim 14 where the symbols can be selected from a class which includes at least one of individuals or animals oriented at different angles, relative to the line of the display, or vehicles which are oriented in selected directions.

25. A game playing apparatus as in claim 14 which includes manually operable game controls, coupled to the processing unit, to enable a player to, in part, control the outcome of the game.

26. A video game playing apparatus comprising:

a housing;

an electronic processing unit carried by the housing;

a display device coupled to the processing unit where a plurality of game symbols is displayed on the device as an array, with rows and columns, where each symbol of the plurality exhibits at least one discrete geometric orientation relative to a line of the display, and where some members of the plurality of symbols have a common geometric orientation and other members of the plurality have at least one different orientation relative to the line of the display;

and wherein the processing unit determines if at least two of the symbols which are adjacent to one another, and, extend across at least two rows of the array at least in part, have the common geometric orientation and exhibit a predetermined winning pattern that comprises a linear arrangement of the at least two symbols on the array where at least one symbol of the winning pattern is in one column and another is in a different column of the array, the winning pattern corresponding to two different intersecting linear configurations with at least one different symbol exhibiting two different geometric orientations relative to the line of the display and, where the symbols of the predetermined winning pattern each exhibit a predetermined, common, visual characteristic within each respective symbol shape.

27. A video game playing apparatus as in claim 26 where at least some of the game symbols exhibit an asymmetric characteristic which defines the geometric orientation of the respective symbol.

* * * * *